United States Patent
Leenaerts et al.

(10) Patent No.: US 9,172,569 B2
(45) Date of Patent: Oct. 27, 2015

(54) PHASED ARRAY ANTENNA AND ASSOCIATED METHODS

(71) Applicant: NXP B.V., Eindhoven (NL)

(72) Inventors: Dominicus Martinus Wilhelmus Leenaerts, Riethoven (NL); Yu Pei, Eindhoven (NL); Ying Chen, Eindhoven (NL)

(73) Assignee: NXP, B.V., Eindhoven (NL)

( * ) Notice: Subject to any disclaimer, the term of this patent is extended or adjusted under 35 U.S.C. 154(b) by 0 days.

(21) Appl. No.: 14/046,798

(22) Filed: Oct. 4, 2013

(65) Prior Publication Data

US 2014/0241463 A1      Aug. 28, 2014

(30) Foreign Application Priority Data

Oct. 5, 2012  (EP) ..................... 12187496

(51) Int. Cl.
| | |
|---|---|
| H04L 27/04 | (2006.01) |
| H04B 7/06 | (2006.01) |
| H01Q 3/26 | (2006.01) |
| H01Q 3/42 | (2006.01) |

(52) U.S. Cl.
CPC .............. *H04L 27/04* (2013.01); *H01Q 3/2682* (2013.01); *H01Q 3/42* (2013.01); *H04B 7/06* (2013.01); *H04B 7/0617* (2013.01); *H04B 7/0671* (2013.01)

(58) Field of Classification Search
CPC ...................................................... H04L 27/04
USPC ........................ 375/267, 299, 260, 346–347
See application file for complete search history.

(56) References Cited

U.S. PATENT DOCUMENTS

| | | | | |
|---|---|---|---|---|
| 5,475,392 | A | * | 12/1995 | Newberg et al. ............... 342/375 |
| 8,526,878 | B2 | * | 9/2013 | Maruhashi et al. ............. 455/39 |
| 2002/0033768 | A1 | * | 3/2002 | Neeman et al. ................ 342/372 |
| 2007/0290930 | A1 | | 12/2007 | Krishnaswamy et al. |

FOREIGN PATENT DOCUMENTS

EP      0 646 982 A1      4/1995

OTHER PUBLICATIONS

Tseng, R. et al. "A Four-Channel Beamforming Down-Converter in 90-nm CMOS Utilizing Phase-Oversampling", IEEE Journal of Solid-State Circuits, vol. 45, No. 11, pp. 2262-2272 (Nov. 2010).
Extended European Search Report for Patent Appln. No. 12187496.0 (Mar. 8, 2013).
Pei, Yu et al.; "A Phase-Shifting Up-Converter for 30GHz Phased Array Applications"; IEEE Radio Frequency Integrated Circuits Symposim; pp. 499-502; 2012.

* cited by examiner

*Primary Examiner* — Qutbuddin Ghulamali (57) ABSTRACT

A phased array transmitter is disclosed comprising a vector modulator, a true time delay block coupled to the vector modulator, a local oscillator phase shifter and RF-converter block coupled to the true time delay block, and an antenna. The vector modulator applies vector modulation to a baseband signal and provides an intermediate frequency signal to the true time delay block. The true time delay block applies a true time delay to the intermediate frequency signal and provides a delayed intermediate frequency signal to the local oscillator phase shifter and RF-converter block. The local oscillator phase shifter and RF-converter block multiplies the delayed intermediate frequency signal by a local oscillator signal and applies a phase shift to the delayed intermediate frequency signal to provide a radio frequency signal to the antenna for onwards transmission.

14 Claims, 9 Drawing Sheets

PHASED ARRAY ANTENNA AND ASSOCIATED METHODS

CROSS-REFERENCE TO RELATED APPLICATIONS

This application claims the priority under 35 U.S.C. §119 of European patent application no. 12187496.0, filed on Oct. 5, 2012, the contents of which are incorporated by reference herein.

The present disclosure relates to the field of phased array antennas.

A phased array antenna/transmitter may be considered to be an array of antennas wherein the relative phases of the signals input to the antennas for transmission are shifted with respect to each other in such as way that the effective radiation pattern emitted from the phased array antenna is reinforced in a particular direction and suppressed in other particular directions. Microwave and millimeter wave phased array transmitters can realise phase shifts in either the local oscillator (LO) or radio frequency (RF) paths.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

According to a first aspect of the invention, there is provided a phased array transmitter comprising a plurality of array elements, each array element comprising:
  a vector modulator;
  a true time delay block coupled to the vector modulator;
  a local oscillator phase shifter and RF-converter block coupled to the true time delay block; and
  an antenna;
wherein
  the vector modulator is configured to apply vector modulation to a baseband signal and provide an intermediate frequency signal to the true time delay block;
  the true time delay block is configured to apply a true time delay to the intermediate frequency signal and provide a delayed intermediate frequency signal to the local oscillator phase shifter and RF-converter block; and
  the local oscillator phase shifter and RF-converter block configured to multiply the delayed intermediate frequency signal by a local oscillator signal and apply a phase shift to the delayed intermediate frequency signal to provide a radio frequency signal to the antenna for onwards transmission.

It is generally advantageous to perform operations on lower frequency signals such as intermediate frequency signals, rather than on higher frequency signals such as radio frequency signals, for example to reduce losses in the circuit. By performing true time delay on an intermediate frequency signal rather than a radio frequency signal, any losses in the true time delay lines are much reduced due to acting on a lower intermediate frequency rather than a higher radio frequency signal. Using the proposed architecture, the length of the true time delay lines remains the same for intermediate frequency as for radio frequency signals. The radio frequency signal provided by the apparatus may be a wide band signal.

By applying a true time delay to an intermediate frequency signal (rather than, for example, to a radio frequency signal), it is possible to advantageously generate an ultra wide band beam and to perform true time delay. Generally, local oscillator phase shifting is only valid for narrow band beamforming, and changing to a different frequency can change the direction of the transmitted beam, which is undesirable. However, the combination of local oscillator phase shifting and intermediate frequency true time delay as disclosed herein advantageously allows the generation of a true time delayed radio frequency signal for (ultra) wide band beamforming wherein the direction of transmission of the signal does not vary with frequency.

The phased array transmitter employs intermediate frequency true time delays. Systems which use radio frequency true time delay often use transmission delay lines to achieve the signal delay. However, tuning such time delays is usually done with radio frequency switches to change the length of the delay line (and thereby change the delay). Using such switches poses severe limitations at millimeter wave frequencies. Further, use of such radio frequency switches often introduce different insertion losses for each delay setting, which need to be compensated for using a variable gain amplifier (VGA), but using VGAs can introduce nonlinearity to the circuit. In general, switches perform much better at intermediate frequencies rather than at radio frequencies. A VGA is not required in the phased array transmitter/receiver with intermediate frequency true time delay disclosed herein, thereby advantageously reducing non-linearity caused by VGAs in the circuit.

The true time delay block, and the local oscillator phase shifter and RF-converter block, may be configured to provide the radio frequency signal with:
  a phase shift which varies substantially linearly with frequency;
  a radio frequency time delay which is substantially independent of frequency; and
  a beam steering angle which is substantially independent of frequency.

The vector modulator may be an in-phase/quadrature vector modulator. Such an in-phase/quadrature vector modulator may comprise at least one vector modulator local oscillator, an in-phase mixer an out-of-phase mixer, and an intermediate frequency combiner. The in-phase mixer may be configured to provide an in-phase intermediate frequency signal by mixing a signal from the at least one vector modulator local oscillator and an in-phase input signal. The out-of-phase mixer may be configured to provide a quadrature intermediate frequency signal by mixing a signal from the at least one vector modulator local oscillator and a quadrature input signal. The in-phase intermediate frequency signal and the quadrature intermediate frequency signal may be combined by the intermediate frequency combiner to provide the intermediate frequency signal.

The local oscillator phase shifter and RF-converter block may comprise a phase shifter local oscillator and a poly-phase filter coupled to the phase shifter local oscillator. The phase shifter local oscillator and poly-phase filter may be configured to provide multiple phase-shifted local oscillator signals. The local oscillator phase shifter and RF-converter block may comprise a frequency divider which may be configured to provide multiple phase-shifted local oscillator signals.

The local oscillator phase shifter and RF-converter block may further comprise a phase-oversampling vector modulation block configured to apply phase-oversampling vector modulation to the delayed intermediate frequency signal received from a true time delay using the multiple phase-shifted local oscillator signals to provide the radio frequency signal. Using a phase-oversampling vector modulator in the LO path, rather than, for example, in the RF path, provides the advantages of improved circuit linearity, true time delay of an IF signal, and ultra-wide band beamforming, as well as tunable amplitude. When a high amplitude resolution is not required, VGAs are not necessary in the circuit, thereby improving linearity further.

The phase-oversampling vector modulator block may comprise:
- a three-state switch block, the three-state switch block configured to apply a phase switch of +1, −1 or 0 to each of the multiple phase-shifted local oscillator signals to provide multiple phase-switched, phase-shifted, local oscillator signals;
- a plurality of mixers configured to mix the multiple phase-switched, phase-shifted, local oscillator signals with the delayed intermediate frequency signal to provide multiple phase-shifted radio frequency signals; and
- a radio frequency combiner configured to combine the multiple phase-shifted radio frequency signals to provide the radio frequency signal.

Each local oscillator phase shifter and RF-converter block may comprise a radio frequency up-converter configured to receive the delayed intermediate frequency signal and provide the radio frequency signal; and a variable phase shifter configured to apply a phase shift to a received phase shifter local oscillator signal in order to provide a phase shifted local oscillator signal to the radio frequency up-converter. Each variable phase shifter of the plurality of array elements may be configured to receive a common phase shifter local oscillator signal.

The plurality of array elements may comprise a first array element and one or more subsequent array elements. The first array element may be configured to receive the intermediate frequency signal directly from the vector modulator. The one or more subsequent array elements may be configured to receive a delayed intermediate frequency signal from a preceding array element in order to provide a further delayed intermediate signal to an associated local oscillator phase shifter and RF-converter block.

The true time delay block may comprise at least one of a switched true time delay line, a tunable discretely passive network having true time delay functionality, and a tunable continuously passive network having true time delay functionality. Switches may be employed to vary the delay applied to the intermediate frequency signals in the circuit, and switching at lower frequencies (such as intermediate frequency) can be beneficial over switching at higher (radio) frequency as losses from the circuit are reduced.

A variable gain amplifier (VGA) may be coupled between the true time delay block and the local oscillator phase shifter and RF-converter block. A VGA may be used, for example, if a higher amplitude resolution is required, but may advantageously not be required for lower amplitude resolution. Omission of VGAs from the circuit may help to maintain a high degree of linearity.

A power amplifier (PA) may be coupled between the local oscillator phase shifter and RF-converter block and the antenna.

According to a further aspect of the invention, there is provided a point-to-point communication system comprising a phased array transmitter as disclosed herein.

According to a further aspect of the invention, there is provided a method of providing a radio frequency signal comprising:
- applying vector modulation to a baseband signal in order to provide an intermediate frequency signal;
- applying a true time delay to the intermediate frequency signal in order to provide a delayed intermediate frequency signal; and
- multiplying the delayed intermediate frequency signal by a local oscillator signal and applying a phase shift to the delayed intermediate frequency signal, thereby providing the radio frequency signal.

According to a further aspect of the invention, there is provided a phased array receiver comprising a plurality of array elements, each array element comprising:
- an antenna;
- a local oscillator phase shifter and RF-converter block coupled to the antenna;
- a true time delay block coupled to the local oscillator phase shifter and RF-converter block; and
- a vector modulator;

wherein
- the local oscillator phase shifter and RF-converter block is configured to apply a local oscillator signal to, and apply a phase shift to, a radio frequency signal received by the antenna to provide a delayed intermediate frequency signal;
- the true time delay block is configured to apply a true time delay to the delayed intermediate frequency signal provided by the local oscillator phase shifter and RF-converter block and provide an intermediate frequency signal to the vector modulator; and
- the vector modulator is configured to apply a vector demodulation to the intermediate frequency signal provided by the true time delay block to provide a baseband signal.

According to a further aspect of the invention, there is provided a method of providing a baseband signal comprising:
- multiplying a radio frequency signal by a local oscillator signal, and applying a phase shift to the radio frequency signal in order to provide a delayed intermediate frequency signal;
- applying a true time delay to the delayed intermediate frequency signal in order to provide an intermediate frequency signal; and
- applying a vector demodulation to the intermediate frequency signal in order to provide the baseband signal.

There is also provided a computer program, which when run on a computer, causes the computer to configure any apparatus, including a circuit such as a phased array circuit, controller, converter, or device such as a phased array antenna/transmitter/receiver/system disclosed herein, or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

A description is now given, by way of example only, with reference to the accompanying drawings, in which:—

Embodiments of the present invention relate to phased array antennas which allow for a combination of true time delay of an intermediate frequency (IF) signal with LO phase shifting to provide true time delayed RF signals with advantageous properties for transmission, including a RF time delay and beam steering angle that are independent of the frequency of the RF signal. This can enable wide band signals to be transmitted satisfactorily.

Also, the phased array antennas disclosed herein may also be used as receivers, thereby allowing for a combination of true time delay of an intermediate frequency (IF) signal with LO phase shifting to provide a baseband signal from a received wide band RF signal. The skilled person will appreciate how the discussion of features of phased array transmitters disclosed herein may be adapted to apply to a phased array receiver.

Figure 1A:
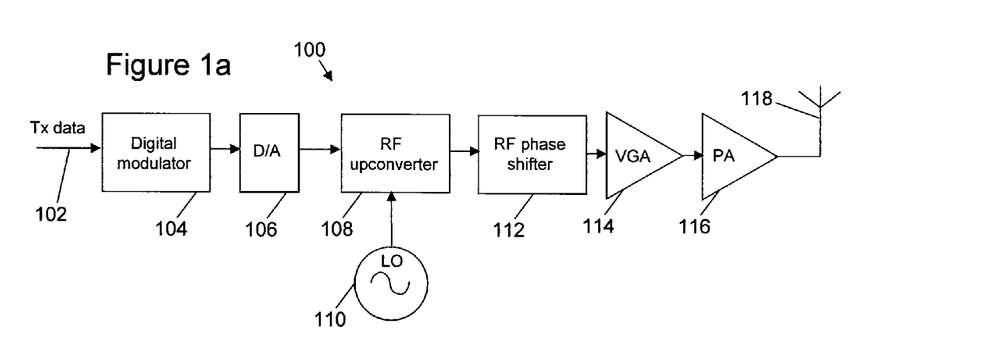
FIG. 1a illustrates a phased array antenna system providing phase shifting in the radio frequency (RF) path.

Microwave and millimeter wave phased array transmitters may realise phase shift in either the local oscillator (LO) or radio frequency (RF) paths. An example of a phased array transmitter performing phase shifting in the RF path is shown in FIG. 1a. An example of a phased array transmitter performing phase shifting in the LO path is shown in FIG. 1b.

FIG. 1a shows a single array element of a phased array system 100 with transmission data 102 being input to a digital modulator 104, which is coupled to a digital to analogue (D/A) converter 106. The D/A converter 106 is coupled to a RF upconverter 108. A LO signal generator 110 provides a local oscillator signal to the RF upconverter 108. The RF upconverter 108 is coupled to a phase shifter 112, which then passes a RF output signal via a variable gain amplifier (VGA) 114 and a power amplifier (PA) 116 to an antenna 118 for transmission. The phase shifter 112 is in the RF path of the circuit.

Figure 1B:
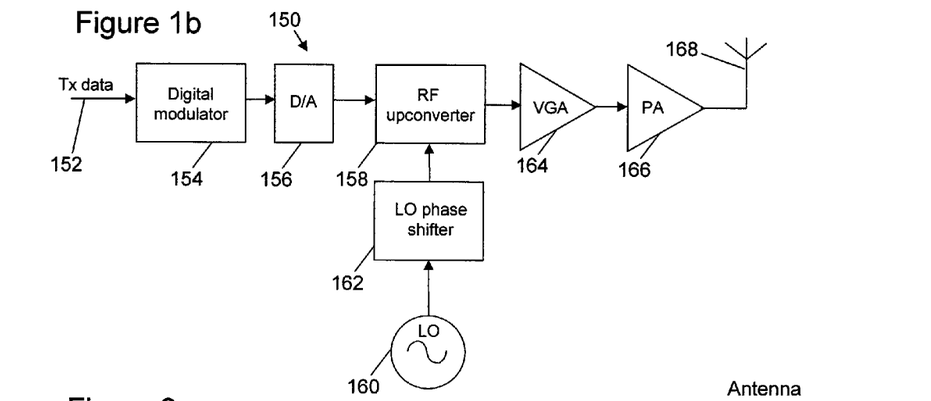
FIG. 1b illustrates a phased array antenna system providing phase shifting in the local oscillator (LO) path.

FIG. 1b shows a single array element of a phased array system 150 with transmission data 152 being input to a digital modulator 154, which is coupled to a digital to analogue (D/A) converter 156. The D/A converter is coupled to a RF upconverter 158. A LO signal generator 160 is coupled to a phase shifter 162, in order to provide a phase-shifted local oscillator signal to the RF upconverter 158. The RF upconverter 158 passes a RF output signal via a VGA 164 and a PA 166 to an antenna 168 for transmission. The phase shifter 162 is in the LO path of the circuit.

The LO phase shifter and RF-converter block 162 of FIG. 1b and the RF phase shifter and RF-converter block 112 of FIG. 1a may include passive networks to realise true time delays, or may include active in-phase/quadrature (I/Q) vector modulators to achieve phase shifting. It may be possible to use a technique known as phase-oversampling vector modulation (POVM) in the RF signal path as an alternative to I/Q vector modulation to improve linearity. POVM shifts the sub-block design complexity to the architectural level.

For RF phase shifting, passive networks, such as those including transmission delay lines, may be used to achieve true time delay and thereby achieve wide band beamforming. Tuning of the time delay using RF switches can pose severe implementation limitations at millimeter-wave frequencies. For example, certain switches (such as high-quality switches) have a small insertion loss and high isolation. Large size switches can help to reduce the insertion loss when the switch is closed. However, due to the parasitic capacitance between the input and output of the switch, the isolation when the switch is turned off can degrade due to the large switch size. This problem can become more severe at higher frequencies, because the influence of the parasitic capacitance becomes higher. Furthermore, switches operating at RF frequencies may behave less linearly than switches operating at IF frequencies.

In addition, tunable time delay blocks can introduce different insertion losses for each delay setting, which need to be compensated for using one or more VGAs. A VGA may also be needed when the beamforming algorithm requires nulling and side-lobe suppression, for example, for tunable output amplitudes. The inclusion of a VGA can degrade transmitter linearity. When active phase shifting is applied in the RF path, as shown in FIG. 1a, beamforming may be accurate only within a narrow bandwidth.

In both passive networks and active phase shifting, the VGAs used in the I/Q vector modulation scheme may introduce additional nonlinearity, which is a critical parameter for many digital modulation schemes with amplitude modulation, such as quadrature amplitude modulation (QAM).

For LO phase shifting, either passive or active, the varying loss and nonlinearity of I/Q VGAs minimally influence the RF signal provided the mixer is hard switched by the LO signal. LO phase shifting may only apply to narrow band beamforming.

Figure 2:
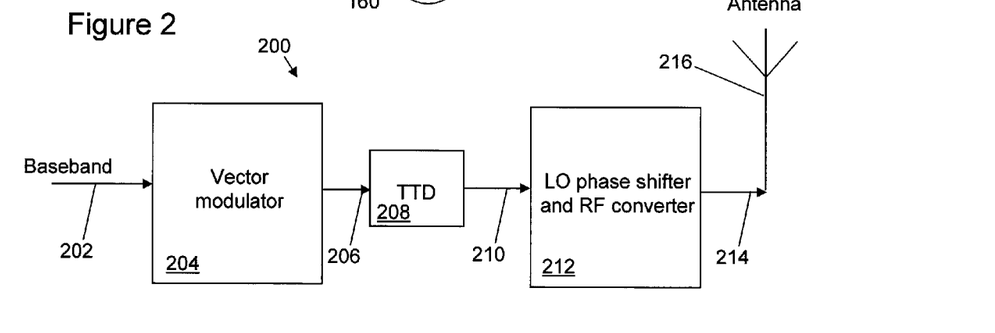
FIG. 2 illustrates a phased array transmitter according to embodiments of the invention.

FIG. 2 illustrates an array element of a phased array antenna according to embodiments of the invention which may address one or more of the problems noted above. It will be appreciated that a phased array antenna comprises a plurality of the array elements shown in FIG. 2, as is known in the art.

The array element 200 is shown comprising a vector modulator 204, a true time delay block 208 coupled to the vector modulator 204, a LO phase shifter and RF-converter block 212 coupled to the true time delay block 208, and an antenna 216 coupled to the LO phase shifter and RF-converter block 212.

The vector modulator 204 is configured to apply vector modulation to a baseband signal 202 received at the vector modulator 204, to provide an IF signal 206 to the true time delay block 208.

The true time delay block 208 is configured to apply a true time delay to the IF signal 206 and provide a delayed IF signal 210 to the LO phase shifter and RE-converter block 212.

The LO phase shifter and RF-converter block 212 is configured to multiply the delayed IF signal 210 by a LO signal and apply a phase shift to the delayed IF signal 210 to provide a RF signal 214 to the antenna 216 for onwards transmission.

When the phased array antenna is used as a transmitter the LO phase shifter and RF-converter block 212 upconverts the delayed IF signal to a RF signal. The RF signal 214 may be a (ultra) wide band signal.

The true time delay block 208 and the LO phase shifter and RF-converter block 212 in this example are configured to provide the RF signal 214 to the antenna 216 with advantageous properties. These properties can include the RF signal 214 having a phase shift which varies substantially linearly with frequency, a RF time delay which is substantially independent of frequency, and a beam steering angle which is substantially independent of frequency. Such relationships with the frequency of the RF signal can enable wide band, or even ultra wide band signals to be transmitted satisfactorily.

It will be appreciated that the same array element can be used to satisfactorily receive wide band RF signals by performing the same or similar processing steps in reverse.

Figure 3:
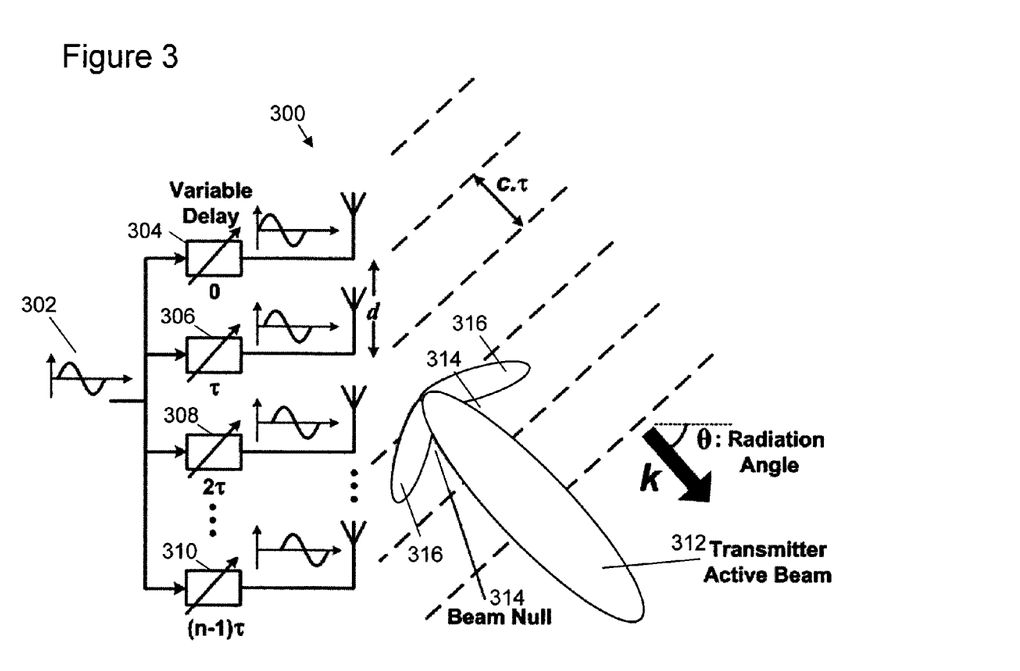
FIG. 3 illustrates a phased array transmitter and beamforming according to embodiments of the invention.

FIG. 3 illustrates, with the equations shown below, how applying a true time delay to an IF signal as shown in FIG. 2 plays an important role in broadening the bandwidth of the system.

FIG. 3 shows a phased array antenna 300 with n multiple antennas. An input signal 302 is provided to a plurality of variable delay components 304, 306, 308, 310, each associated with one of the n antennas. The variable delay components 304, 306, 308 310 apply a time delay (a multiple of z) to the input signal 302 such that the signals transmitted by the individual antennas provide a transmitter active beam 312 at an angle θ to a plane normal to the plane of the multiple antennas. θ is the target radiation angle, d is the spacing between antennas, c is the wave speed, k is the wavevector, and τ is the time delay. The transmitter active beam 312 is shown along the direction of wavevector k, with two beam nulls 314 and two side lobes 316.

The following equation may be used to show the difference between true time delay and phase shifting:

$$\theta = \sin^{-1}\left(\frac{c\tau}{d}\right) = \sin^{-1}\left[\frac{\phi}{360 \times d/\lambda}\right] \quad (1)$$

where λ is the signal wavelength and the other symbols have the same meanings as per FIG. 3. The signal at the antenna should have an incremental time delay τ, or incremental phase shift φ. From the equation above, it can be seen that the incremental time delay τ is independent of frequency, but that φ is wavelength dependent (and therefore frequency dependent). This means that, for a wide band signal, the beam angle spreads as the frequency range increases.

According to embodiments of the invention, the desired RF phase shift $\phi_c$, for the central frequency, is split into two parts: $\phi_c = \phi_{LO} + \phi_{IF,c}$: where $\phi_{LO}$ is the LO phase shift and $\phi_{IF,c}$ is the central IF phase shift.

By realising $\phi_{IF,c}$ with an IF true time delay $\tau_{IF}$, the IF time delay can be set such that $$\tau_{IF} = \frac{\phi_{IF,c}}{(2\pi f_{IF,c})} \quad (2)$$

where $f_{IF,c}$ is the central frequency of the IF signal. Assuming the LO signal has a single frequency $f_{LO}$, and the IF signal has a central frequency $f_{IF,c}$, and a bandwidth BW, then the RF signal has a central frequency $$f_{RF,c} = f_{IF,c} + f_{LO} \quad (3)$$

and bandwidth BW.

When the IF and LO paths phase combining ratio satisfies the following condition:

$$\phi_{IF,c} = \frac{f_{IF,c}}{f_{RF,c}} \times \phi_c \quad (4)$$

Then substituting equation (4) into equation (2) gives $$\tau_{IF} = \frac{\phi_c}{2\pi f_{RF,c}} \quad (5)$$

And by substituting equation (4) and equation (3) into $\phi_{LO} = \phi_c - \phi_{IF}$ the following equation can be derived:

$$\phi_{LO} = \quad (6)$$
$$\phi_c - \phi_c \times \frac{f_{IF,c}}{f_{RF,c}} = \phi_c \times \left(1 - \frac{f_{IF,c}}{f_{RF,c}}\right) = \phi_c \times \frac{f_{RF,c} - f_{IF,c}}{f_{RF,c}} = \phi_c \times \frac{f_{LO}}{f_{RF,c}}$$

then within the bandwidth BW $$f_{IF} = f_{IF,c} + \Delta f \quad (7)$$

and $$f_{RF} = f_{RF,c} + \Delta f$$

wherein $$\Delta f \in \left[-\frac{BW}{2}, \frac{BW}{2}\right]$$

Thus in order to show that, within the BW, the RF incremental time delay $\tau_{RF}$ is equal to the central RF incremental time delay $\tau_{RF,c}$ consider:

$$\tau_{RF} = \frac{\phi_{RF}}{2\pi f_{RF}} = \frac{\phi_{LO} + \phi_{IF}}{2\pi f_{RF}} \quad (8)$$

and by definition:

$$\phi_{IF} = 2\pi f_{IF} \times \tau_{IF} \quad (9)$$

By substituting equation (9) and equation (6) into equation (8):

$$\tau_{RF} = \frac{\phi_{LO} + \phi_{IF}}{2\pi f_{RF}} = \frac{\phi_c \times \frac{f_{LO}}{f_{RF,c}} + \tau_{IF} \times 2\pi f_{IF}}{2\pi f_{RF}} \quad (10)$$

Then substituting equation (5) into equation (10) gives:

$$\tau_{RF} = \frac{\phi_c \times \frac{f_{LO}}{f_{RF,c}} + \frac{\phi_c}{2\pi f_{RF,c}} \times 2\pi f_{IF}}{2\pi f_{RF}} = \frac{\phi_c}{2\pi f_{RF,c}} = \tau_{RF,c} \quad (11)$$

It can be seen that the RF incremental time delay $\tau_{RF}$ is equal to the central RF incremental time delay $\tau_{RF,c}$. Thus, the RF time delay does not vary with the bandwidth BW. Thus also, the beam steering angle of any IF signal is the same as the central frequency signals.

Considering equations (2), (5) and (11), it can also be seen that $\tau_{IF}$ in this case equals the same value if the total true time delay is applied in the RF path:

$$\tau_{IF} = \frac{\phi_{IF,c}}{2\pi f_{IF,c}} = \frac{\phi_c}{2\pi f_{RF,c}} = \tau_{RF} \quad (12)$$

Therefore, if the true time delay is implemented with true time delay lines, the lengths required for the true time delay lines at IF frequencies are equal to those required at RF frequencies. Otherwise, if the total delay is implemented at IF frequency, the required lengths of the delay lines will be $f_{RF,c}/f_{IF,c}$ times larger than those required at RF frequencies.

Compared with the topology of the RF phase shifting realised by using true time delay lines, putting true time delay lines at IF provides several benefits. At least some of the advantages derive from the fact that IF signals have a lower frequency than RF signals.

Firstly, the losses of true time delay lines are lower at IF frequencies than at higher RF frequencies. Secondly, with LO phase shifting, the lengths of the true time delay lines at IF frequencies are equal to those required at RF frequencies. In most cases, the delay lines used in the phased array transmitter take up significant chip area. Minimizing or reducing their occupied area not only reduces the chip cost, but also makes it easier for the floor-planning of the full chip. Thirdly, when switching true time delay lines, the switches have better performances (for example, lower losses and better isolation) at IF frequencies than at higher RF frequencies. Of course, switched true time delay lines are not the only way to realise IF true time delays. Other types of tunable (discretely or continuously) passive or active network which have true time delay properties also satisfy this concept and can be used.

Figure 4:
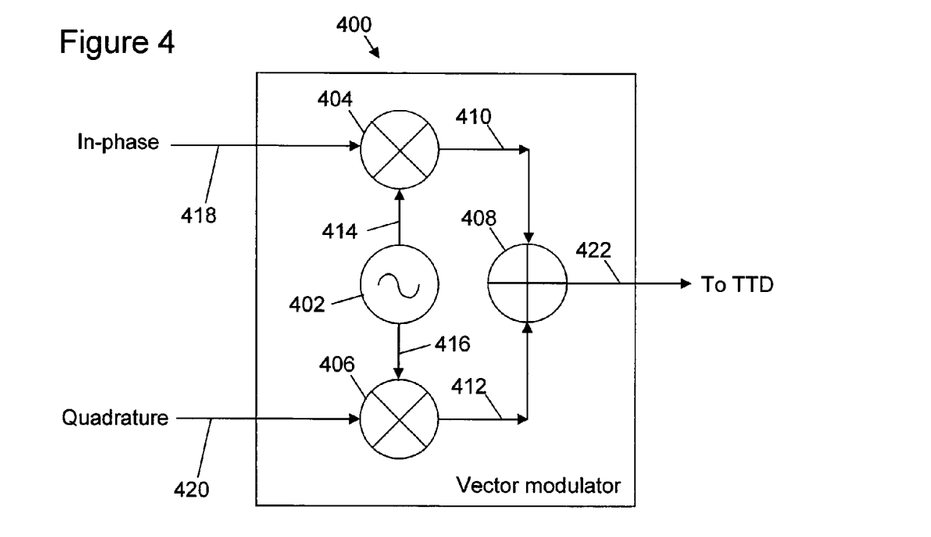
FIG. 4 illustrates an I/Q vector modulator according to embodiments of the invention.
Figure 5A:
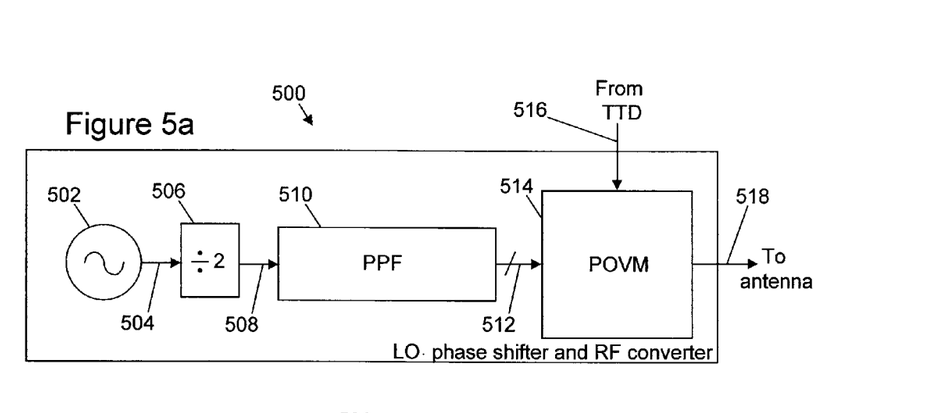
FIG. 5a illustrates a LO phase shifter and RF-converter block according to embodiments of the invention.
Figure 5B:
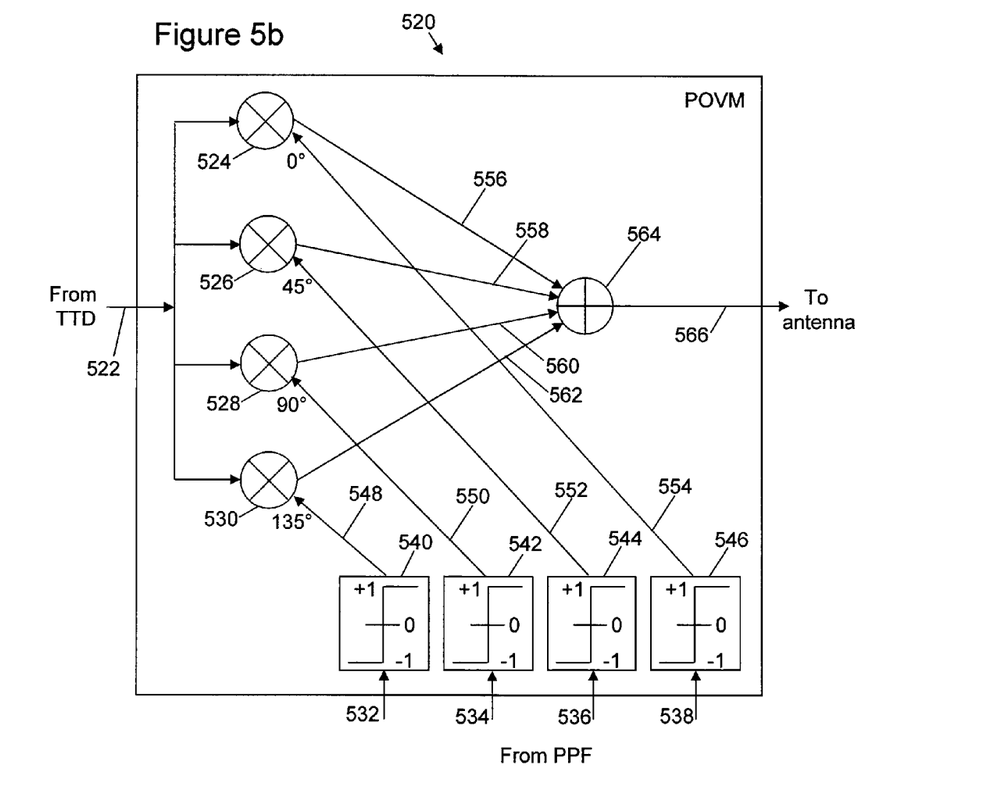
FIG. 5b illustrates a phase-oversampling vector modulator (POVM) according to embodiments of the invention.
Figure 6A:
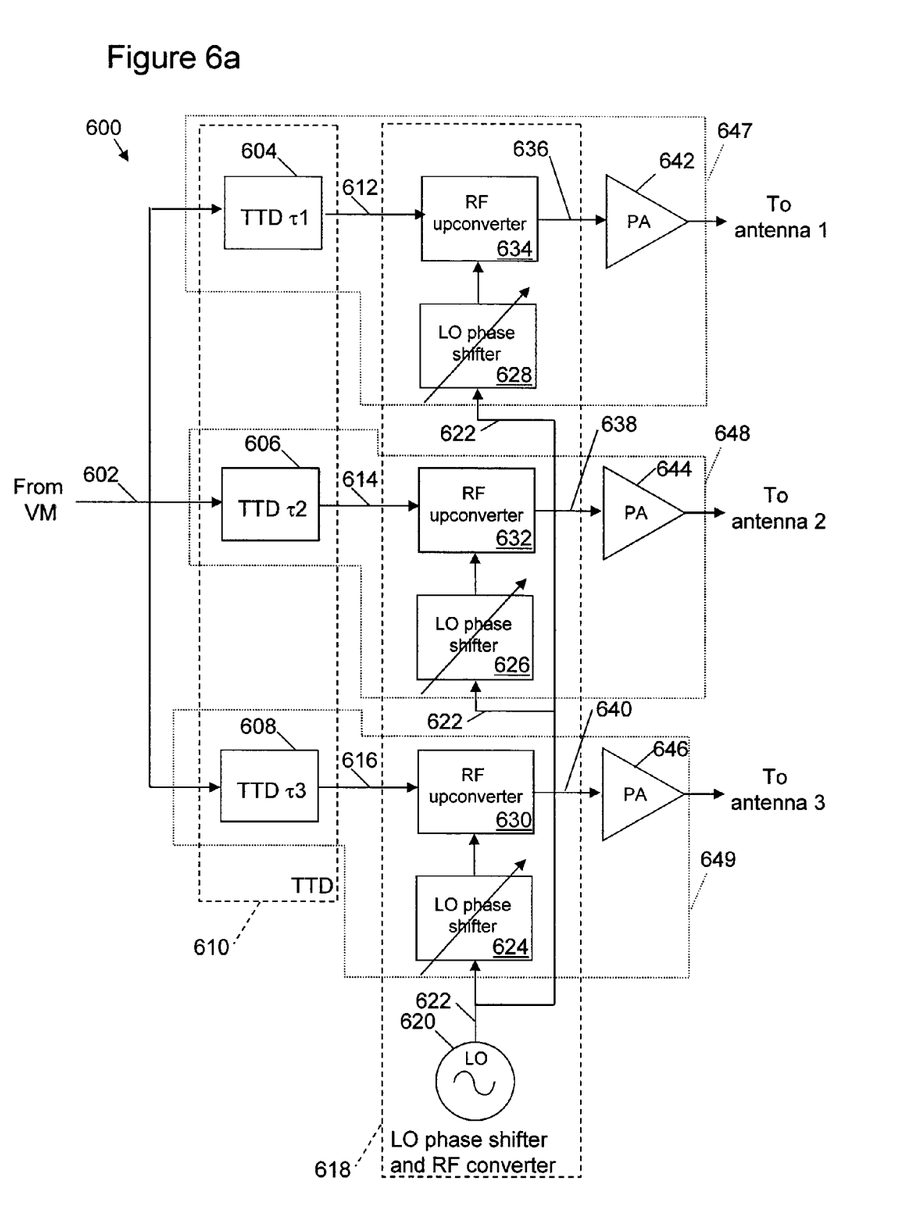
FIGS. 6a and 6b each illustrate a true time delay block and a LO phase shifter and RF-converter block according to embodiments of the invention.
Figure 6B:
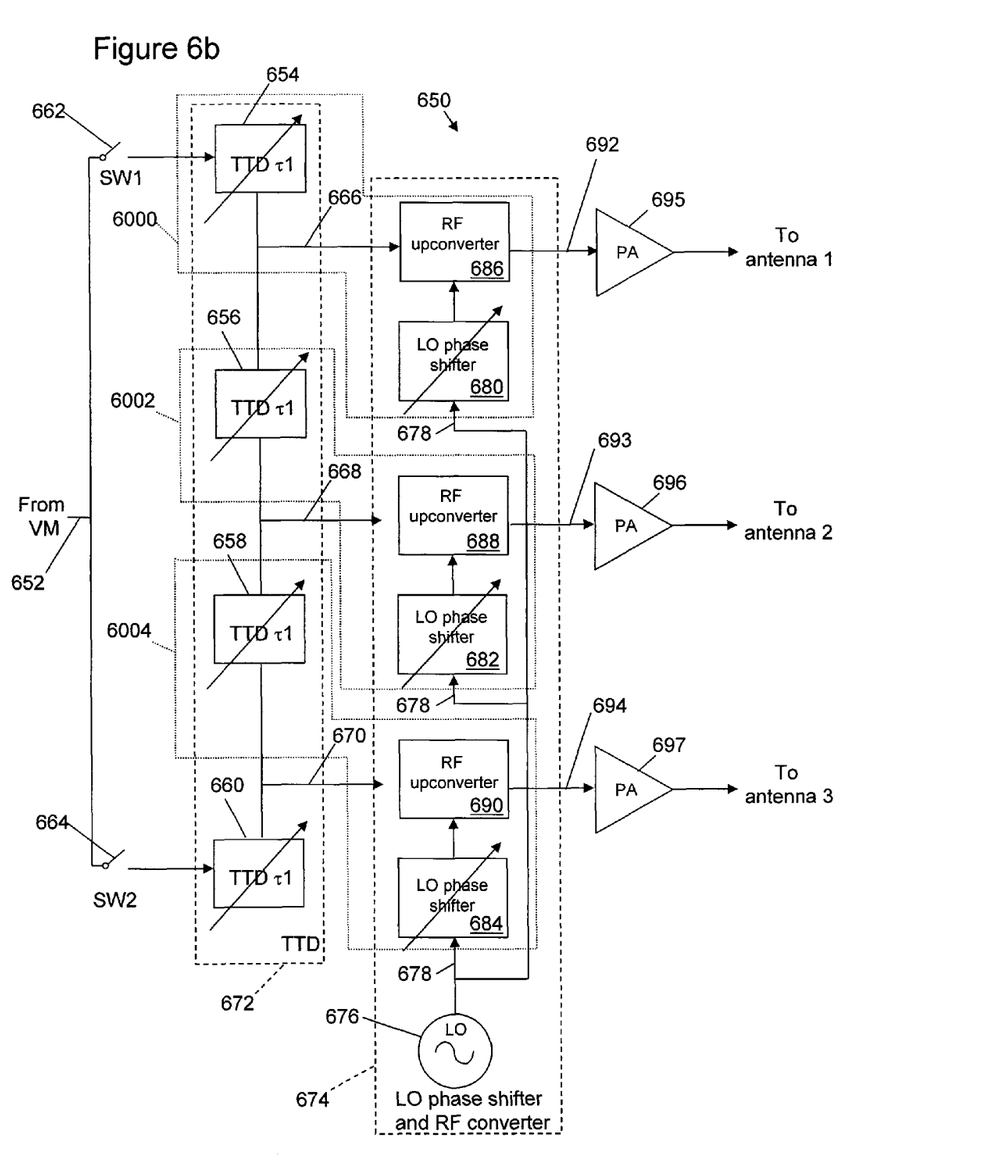

FIGS. 4-6 illustrate components which may be used in the block diagram of FIG. 2 to implement a phased array antenna according to embodiments of the invention.

FIG. 4 shows an in-phase/quadrature (I/Q) vector modulator 400 which may be used as the vector modulator in the phased array antenna circuit according to embodiments of the invention. The I/Q vector modulator 400 comprises, in this example, one vector modulator local oscillator (LO) 402 which is configured to provide a first LO signal 414 to an in-phase mixer 404 and a second LO signal 416, which is 90° out of phase to the first LO signal 414, to an out-of-phase/quadrature mixer 406. Alternatively, more than one vector modulator LO 402 may be used, each providing the required local oscillator signal to the in-phase mixer 404 and quadrature mixer 406. The mixers 404, 406 may multiply input signals together to mix them. The output from the in-phase mixer 404 is an in-phase IF signal 410 and the output of the out-of-phase/quadrature mixer 406 is an out-of-phase IF signal 412. The IF signals 401, 412 are provided to an IF combiner 408. Such an IF combiner 408 may be an adder.

The in-phase IF signal 410 and the out-of-phase/quadrature IF signal 412 are combined by the IF combiner 408 to provide the IF signal 422 to the true time delay block. In other embodiments it may not be necessary to use I/Q vector modulation; another form of vector modulation may be used.

FIG. 5a illustrates a LO phase shifter and RF-converter block 500 according to embodiments of the invention. The LO phase shifter and RF-converter block 500 shown comprises a phase shifter local oscillator (LO) 502 coupled via a frequency divider 506 to a poly-phase filter 510. Multiple signals with different phases are generated in this example by the frequency divider 506 and the poly-phase filter 510.

The phase shifter LO 502 is configured to generate a LO signal 504 which passes to the frequency divider 506 to be divided to generate quadrature phases (0°, 90°, 180°, 270°) at 508. The divided signal is passed to the poly-phase filter 510. The poly-phase filter 510 outputs eight phase-shifted LO signals 512—0°, 45°, 90°, 135°, 180°, 225°, 270°, 315° (i.e. differential signals of 0°, 45°, 90°, 135°) to a phase-oversampling vector modulator (POVM) 514. The POVM 514 also receives IF signals 516 from the true time delay in the IF path of the phased array antenna circuit. The POVM then outputs a signal 518 for transmission via an antenna.

The POVM 514 is in the LO path (in the LO phase shifter and RF-converter 500), thereby improving the transmitter linearity compared with a transmitter having a POVM in the RF path. The POVM in the LO path of the circuit provides LO phase shifting advantages (improved linearity, true time delay and ultra-wide band beamforming) as well as providing a tunable amplitude. When high amplitude resolution is not required, VGAs may not be required in the circuit, which further improves the linearity.

The combination of the POVM being in the LO path, as well as having an IF true time delay block (that is, the delay acts on an IF signal) rather than a RF true time delay block for example, provides true time delay and ultra-wide band beamforming. In theory an infinite bandwidth is obtained. It might be expected that LO phase shifting will only be valid for narrow-band beamforming. However, by using an IF true time delay in the signal path before the POVM to provide a combination of LO phase shifting and IF true time delay in a particular ratio, the output obtainable can be a true time delayed RF signal.

Thus regarding FIG. 5a, the phase shifter LO 502 and poly-phase filter 510 are configured to provide multiple phase-shifted LO signals 512. The POVM 514 is configured to apply phase-oversampling vector modulation to the signal 516 received from the TTD using the multiple phase-shifted LO signals 512 in order to provide a RF signal 518 for transmission.

FIG. 5b illustrates a POVM 520 according to embodiments of the invention. The POVM 520 is configured to apply phase-oversampling vector modulation to a delayed IF signal 522 received from a TED using the multiple phase-shifted LO signals 532, 534, 536, 538 in order to provide the RF signal 566. Multiple phase shifted LO signals 532, 534, 536, 538 are generated, as for example shown in FIG. 5a by a poly-phase filter 510.

The POVM 520 in FIG. 5b comprises three-state switch blocks (which may be considered +1, −1, 0 blocks) 540, 542, 544, 546 for each of the phase shifted LO signals 532, 534, 536, 538. The three-state switch blocks 540, 542, 544, 546 are configured to apply a phase switch of +1, −1 or 0 to each of the multiple phase-shifted LO signals 532, 534, 536, 538 to provide multiple phase-switched, phase-shifted, LO signals 548, 550, 552, 554. The three-state switch blocks 540, 542, 544, 546 are in the LO path and are configured to switch the LO phase between 0° (by multiplying by +1) and 180° (by multiplying by −1), or switch off the phase section (by multiplying by 0).

The POVM 520 also comprises a plurality of mixers 524, 526, 528, 530 configured to mix the multiple phase-switched, phase-shifted, LO signals 548, 550, 552, 554 with the delayed IF signal 522 to provide multiple phase-shifted RF signals 556, 558, 560, 562. As shown in FIG. 5b, a first phase-switched, phase-shifted, LO signal 554 at 0° phase is mixed with the delayed IF signal 522 to provide a first phase-shifted RF signal 556. A second phase-switched, phase-shifted, LO signal 552 at 45° phase is mixed with the delayed IF signal 522 to provide a second phase-shifted RF signal 558. A third phase-switched, phase-shifted, LO signal 550 at 90° phase is mixed with the delayed IF signal 522 to provide a third phase-shifted RF signal 560. A fourth phase-switched, phase-shifted, LO signal 548 at 135° phase is mixed with the delayed IF signal 522 to provide a fourth phase-shifted RF signal 562.

The POVM 520 also comprises a RF combiner 564 configured to combine the multiple phase-shifted RF signals 556, 558, 560, 562 to provide the RF signal 566 for onwards transmission by the antenna. The RF combiner 564 may be an adder, for example.

Use of the three-state switch blocks 540, 542, 544, 546 can enable a desired overall phase shift to be applied by adding or subtracting combinations of the different phased differential LO signals (0°, 45°, 90°, 135°) 532, 534, 536, 538 received from the poly-phase filter. The 81 ($3^4$) different points are generated from all possible combinations of the three states (+1, −1, 0) of the four phases (0°, 45°, 90°, 135°). The amplitude and phase resolution depend on the number of phased LO signals used. For example, if 16, rather than 8, phases were used then the gain constellation plot would contain 6561 ($3^8$) points. If a two-stage switch (for example, +1 and −1) was used, the plot would contain 16 ($2^4$) points. The amplitude changes depending on the switch states. In this way the POVM 520 can be used to apply a phase shift to the RF signal for each individual antennas of the phased array antenna in order to steer the directed beam of the phased array antenna in a desired direction. If a greater resolution of beam direction is required then a poly-phase filter with a higher number of differently phased signals can be used.

FIG. 6a shows a true time delay block 610 and a LO phase shifter and RF-converter block 618 for three array elements 647, 648, 649 of a phased array antenna according to embodiments of the invention. An IF signal 602 from the vector modulator is passed to the true time delay block 610, then to the LO phase shifter and RF-converter block 618, before passing as a RF signal to an antenna for transmission.

The true time delay block 610 comprises a plurality of true time delay elements 604, 606, 608 configured to provide a delayed IF signal 612, 614, 616 to the LO phase shifter and RF-converter block 618 for each of the array elements/antennas (647, 648, 649) in the phased array.

The IF signal 602 from the vector modulator is passed to each of three true time delay elements 604, 606, 608, which in this example are labelled "TTD τ1", "TTD τ2" and "TTD τ3", in the true time delay block 610. Each true time delay element 604, 606, 608 tunes the delay applied to the IF signal 602 for each antenna in order to define the directionality of the phased array. When large number of array elements are required for narrow beamwidths transmission, each true time delay block is required to have a larger time delay range, although a larger true time delay consumes more chip area.

Each of the delayed IF signals 612, 614, 616 pass to a respective RF upconverter 634, 632, 630 for RF upconversion. Each RF upconverter 634, 632, 630 receives, via a respective variable LO phase shifter and RF-converter 628, 626, 624, a LO signal from a phase shifter LO 620. Each RF upconverter 634, 632, 630 therefore upconverts the received delayed IF signal 612, 614, 616 using a phase-shifted LO signal to provide a RF signal 636, 638, 640. In this example each RF signal 636, 638, 640 passes through a respective power amplifier (PA) 642, 644, 646 before being provided to an antenna (antenna 1, antenna 2 or antenna 3) for transmission.

The LO phase shifter and RF-converter block 618 comprises a phase shifter LO 620, which is common to each of the array elements 657, 658, 659. The LO phase shifter and RF-converter block 618 also includes a plurality of variable phase shifters 624, 626, 628, one for each of the array elements 657, 658, 659, that receive a LO signal from the phase shifter LO 620. Also provided are a plurality of RF up-converters 630, 632, 634, one for each array element 647, 648, 649, that each receive a phase-shifted LO signal from an associated one of the plurality of variable phase shifters 624, 626, 628. The RF up-converters 630, 632, 634 are configured to apply RF up-conversion to the delayed IF signals 616, 614, 612 to provide a RF signal, 640, 638, 636 to each of the individual antennas of the phased array.

FIG. 6b shows an alternative to FIG. 6a which may be referred to as a path sharing bi-directional true time delay circuit, and includes a true time delay block 672 and a LO phase shifter and RF-converter block 674 according to embodiments of the invention.

An IF signal 652 from the vector modulator is passed to the true time delay block 672. The TTD block 672 passes a plurality of delayed IF signals 666, 668, 670 (one per antenna/array element 6000, 6002, 6004) to the LO phase shifter and RF-converter block 674. The LO phase shifter and RF-converter block 674 passes a RF signal to each of the three illustrated antennas for transmission. The array elements 6000, 6002, 6004 illustrated in FIG. 6b are shown assuming that switch SW1 is closed and switch SW2 is open. If switch SW2 is closed and SW1 is open, then the array elements would be defined such that array element 6000 comprises second delay element 656 instead of first delay element 654, array element 6002 comprises third delay element 658 instead of second delay element 656, and array element 6004 comprises fourth delay element 660 instead of third delay element 658.

The true time delay block 672 comprises a plurality of variable true time delay elements 654, 656, 658, 660 in series each configured to apply the same delay to a received signal in this example.

The IF signal 652 from the vector modulator is passed to either the first or fourth true time delay element 654, 660 depending on whether one of two switch is closed. If switch SW1 662 is closed then the IF signal 652 is provided directly to the first TTD element 654. If switch SW2 664 is closed then the IF signal 652 is provided directly to the fourth TTD element 660. Providing such switches 662, 664 can reverse the flow of the IF signal 652 through the series network of TTD elements 654, 656, 658, 660, which is why it may be referred to as a bi-directional. Such an arrangement can assist with the control of the directionality of the phased array antenna. A further option is to close both SW1 and SW2 at the same time. In this case there is no relative delay between the different antenna elements, and the RF signal is transmitted perpendicularly to the array on antennas.

If switch SW1 662 is closed and switch SW2 664 is open then:
  the first delay element 654 provides a path delay of τ1 to the IF signal 652 to give a delayed IF signal 666 for antenna 1;
  the second delay element 656 provides a path delay of 2*τ1 (that is, the sum of the first and second TTD elements 654, 656) to the IF signal 652 to give a delayed IF signal 668 for antenna 2;
  the third delay element 658 provides a path delay of 3*τ1 to the IF signal 652 to give a delayed IF signal 670 for antenna 3.

If switch SW2 664 is closed and switch SW1 662 is open then the flow of the IF signal 652 through the true time delay elements 654, 656, 658, 660 is reversed such that it starts at the fourth delay element 660 to provide a delayed IF signal 670 to antenna 3 and finishes at the second delay element 656 to provide a delayed IF signal 666 to antenna 1.

The phase shift provided by the LO phase shifters 680, 682, 684 and the time delay provided by the true time delay elements 654, 656, 658, 660 may be tuned together for the required beam steering angle and pattern, and are able to maintain $\tau_{RF}$ equal to $\tau_{RF,c}$, by ensuring $$\phi_{IF,c} = \frac{f_{IF,c}}{f_{RF,c}} \times \phi_c$$

as discussed above for wide band true time delay provision.

Each of the delayed IF signals 666, 668, 670 pass to a respective RF upconverter 686, 688, 690 for RF upconversion in a similar way to that described in relation to FIG. 6a, using respective variable LO phase shifters 680, 682, 684 and a phase shifter LO 676 to generate a LO signal. Power amplifiers (PA) 695, 696, 697 are used in this example to amplify the RF signals 692, 693, 694 for the respective antennas (antenna 1, antenna 2 and antenna 3).

Figure 7:
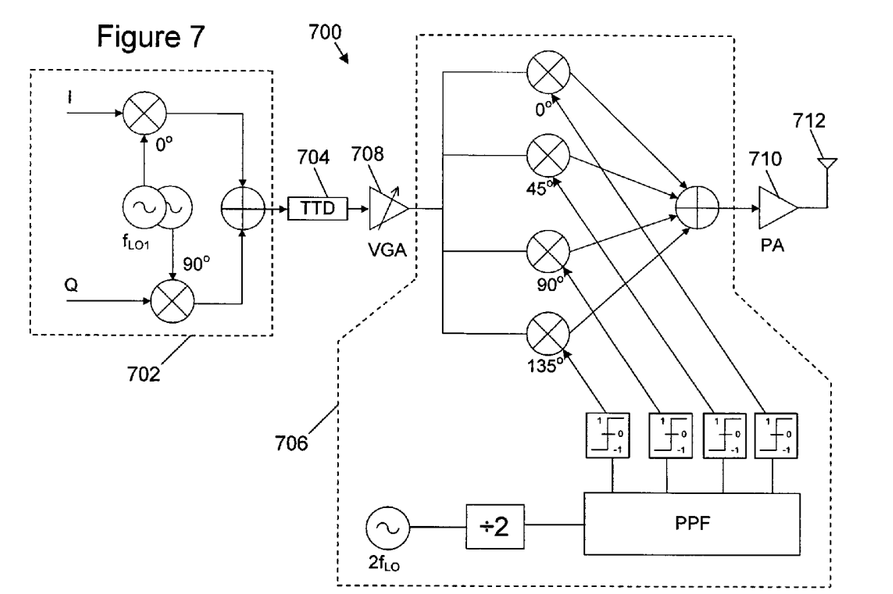
FIG. 7 illustrates a phased array transmitter according to embodiments of the invention.

FIG. 7 illustrates an array element of a phased array antenna 700 according to embodiments of the invention. FIG. 7 includes an I/Q vector modulator 702 as shown in FIG. 4, and a true time delay (TTD) block 704 coupled to the I/Q vector modulator 702. The TTD block 704 is configured to apply a delay to an IF signal received from the I/Q vector modulator 702. FIG. 7 also includes a local oscillator phase shifter and RF-converter block 706, as shown in FIGS. 5a and 5b, coupled to the true time delay block 704. The LO phase shifter and RF-converter block 706 is configured to multiply the delayed IF signal by a local oscillator signal and apply a phase shift to the delayed IF signal to provide a RF signal for transmission by an antenna 712.

In this example a variable gain amplifier (VGA) 708 is coupled between the true time delay block 704 and the local oscillator phase shifter and RF-converter block 706. A power amplifier (PA) 710 is also coupled between the local oscillator phase shifter and RF-converter block 706 and the antenna 712. FIG. 7 illustrates a general architecture. A VGA 708 is included to increase the amplitude resolution compared with an architecture in which no VGA is present in the circuit. The circuit of FIG. 7 operates if the VGA 708 is not present. A PA 710 is included to show a complete transmitter chain in this example.

Figure 8:
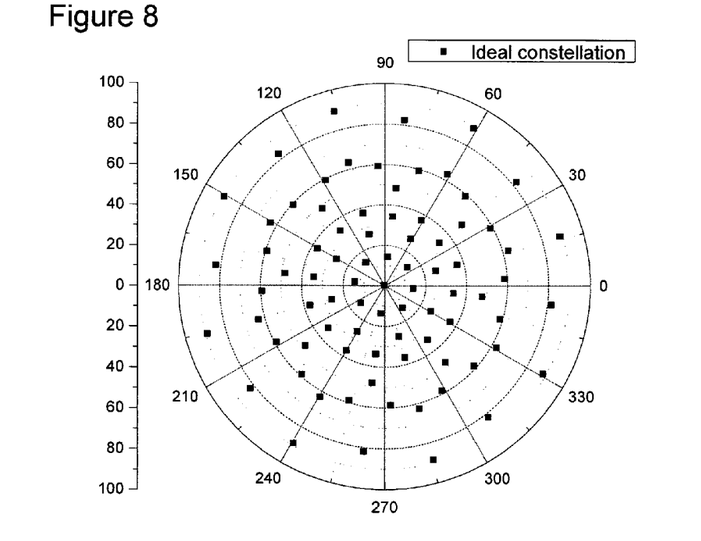
FIG. 8 illustrates a gain constellation of a phased array transmitter according to embodiments of the invention.

FIG. 8 shows a gain constellation plot of signals that can be provided for transmission by a phased array antenna comprising array elements such as that of FIG. 7 without the VGA 708. The normalized relative amplitude is shown on the radial axis and angle of signal transmission in degrees is shown on the angular axis.

The POVM of the local oscillator phase shifter and RF-converter block 706 of FIG. 7 may achieve 81 complex gain in total with 10° phase resolution and 1-2 bit amplitude resolution. If a higher amplitude resolution is required, a two or three-bit VGA can be added to the circuit before the POVM to improve the amplitude resolution of the output constellation without departing from the scope of this disclosure. If a higher phase resolution is required, more phase sections can be included. For example, instead of using eight phases of LO, 16 phases can be used (i.e. differentially 0°, 22.5, 45°, 67.5°, 90°, 112.5°, 135°, 157.5°). Then eight three-state switch blocks and eight mixers will be needed instead of four. Further, the multiphase LO generation chain comprising a phase shifter LO 502, frequency divider 506 and poly-phase filter 510 needs to be modified to output 16 phases of LO signals. However, the concept is the same as that disclosed herein, as the skilled person will appreciate. Also it is possible to change the frequency plan without departing from this disclosure.

FIGS. 9a-9b and 10a-10d show the results of computer simulations to illustrate the theoretical operation of the phased array antennas according to embodiments disclosed herein.

Figure 9A:
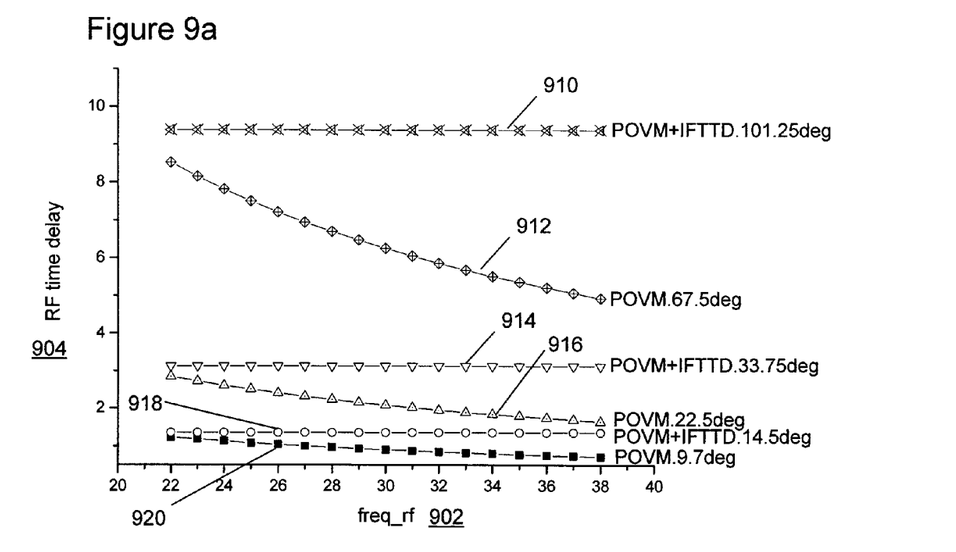
FIGS. 9a-9b illustrate simulation results of the RF phase shift and RF time delay for phased array antennas according to embodiments of the invention.

FIG. 9a shows the simulated RF time delay 904 on the vertical axis plotted against RF frequency 902 on the horizontal axis for a wide band signal. Plots are shown for phased array antennas both with and without true time delays at IF.

Three plots 912, 916, 920 are shown for a phased array transmitter with a phase-oversampling vector modulator (POVM) described earlier, but without a true time delay at IF. Each plot represents operation at a different beam steering angle: a first plot 912 represents a beam steering angle of 67.5°; a second plot 916 represents a beam steering angle of 22.5°; and a third plot 920 represents a beam steering angle of 9.7°. It can be seen from each of these plots 912, 916, 920 that the RF time delay decreases with increasing RF frequency 902. That is, RF signals with different frequencies require a different RF time delay to be directed at a certain angle.

Three plots 910, 914, 918 are shown for a phased array antenna with a phase-oversampling vector modulator (POVM) and a true time delay at IF. Each plot 910, 914, 918 represents operation at a different beam steering angle, which are the same as the beam steering angles of the three plots 912, 916, 920 mentioned above. It can be seen from each of these plots 910, 914, 918 that the RF time delay is constant with increasing RF frequency 902. It is advantageous to have a constant time delay with frequency (a frequency independent time delay) to allow for the formation of a wide band beam with stable directionality. That is, a single RF time delay can be used to satisfactorily direct signals with wide-ranging signal frequencies.

Figure 9B:
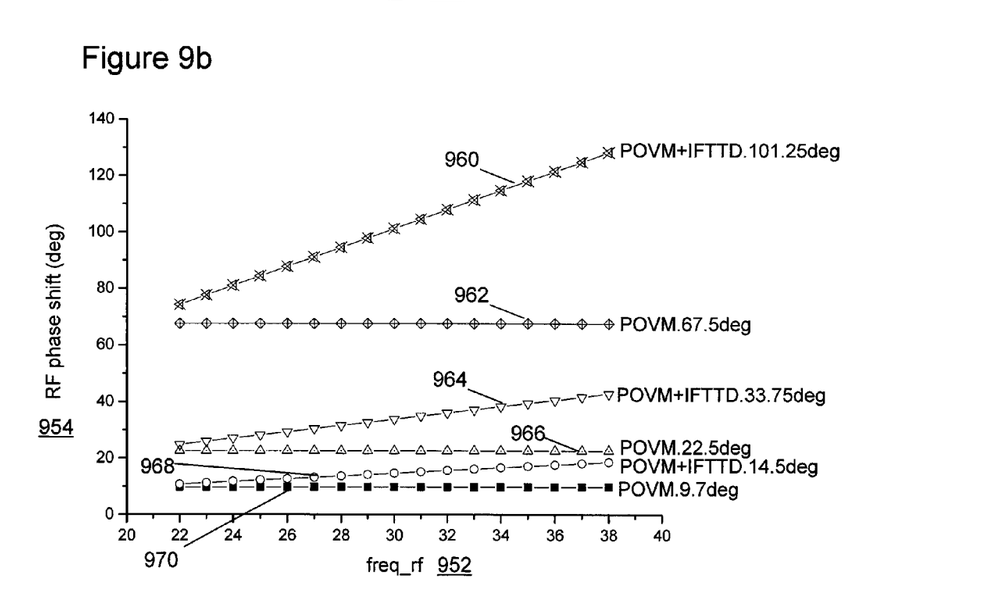

FIG. 9b shows the simulated RF phase shift 954 on the vertical axis plotted against frequency 952 on the horizontal axis for a wide band signal. Plots are shown for phased array antennas both with and without true time delays at IF.

Three plots 962, 966, 970 are shown for a phased array transmitter with a phase-oversampling vector modulator (POVM) but without a true time delay at IF. Each plot represents operation at a different beam steering angle: a first plot 962 represents a beam steering angle of 67.5°; a second plot 966 represents a beam steering angle of 22.5°; and a third plot 970 represents a beam steering angle of 9.7°. It can be seen from each of these plots 962, 966, 970 that the RF time delay is constant over a range of RF frequencies 952. That is, RF signals with different frequencies require a different RF phase shift time delay to be directed at a certain angle.

Three plots 960, 964, 968 are shown for a phased array transmitter with a phase-oversampling vector modulator (POVM) and a true time delay at IF. Each plot 960, 964, 968 represents operation at a different beam steering angle, which are the same as the beam steering angles of the three plots 962, 966, 970 mentioned above. It can be seen from each of these plots 960, 964, 968 that the RF time delay increases linearly with increasing RF frequency 902. It is advantageous to have a linearly varying phase shift with frequency because a constant time delay at RF can be used that automatically provides the required phase shift for each frequency. This is due to the fact that the wavelength of the signal inversely varies with frequency, and therefore a fixed time delay represents a linearly increasing RF phase shift with increasing RF frequencies.

FIGS. 10a-10d show the simulated time delay and beam steering angle for systems with, and without, IF true time delay.

Figure 10A:
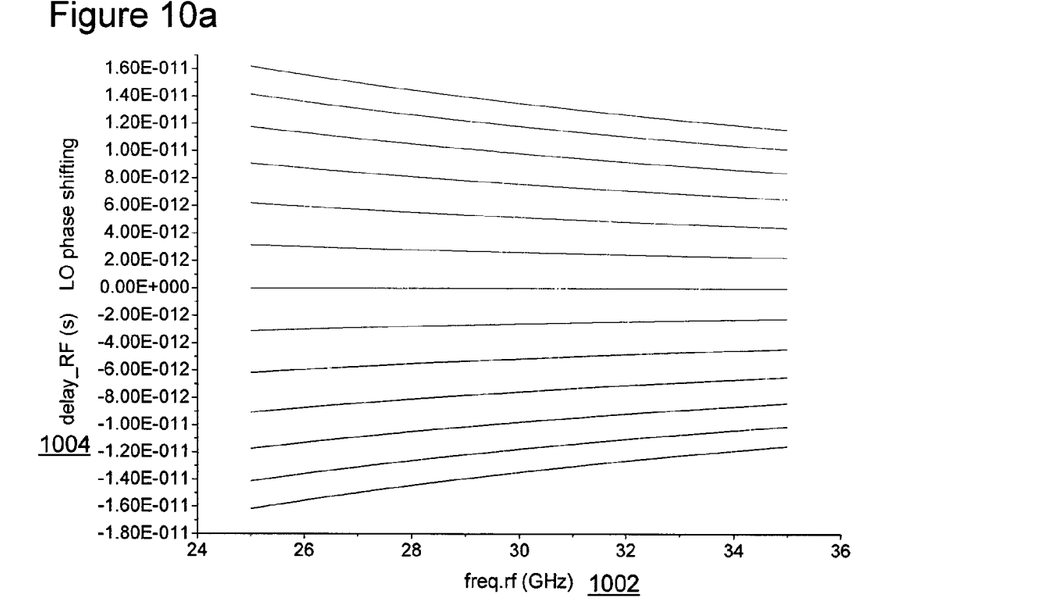
FIGS. 10a-10b illustrate simulation results of the RF signal delay and the beam steering angle for phased array antennas using an LO phase shifter without true-time-delay.
Figure 10B:
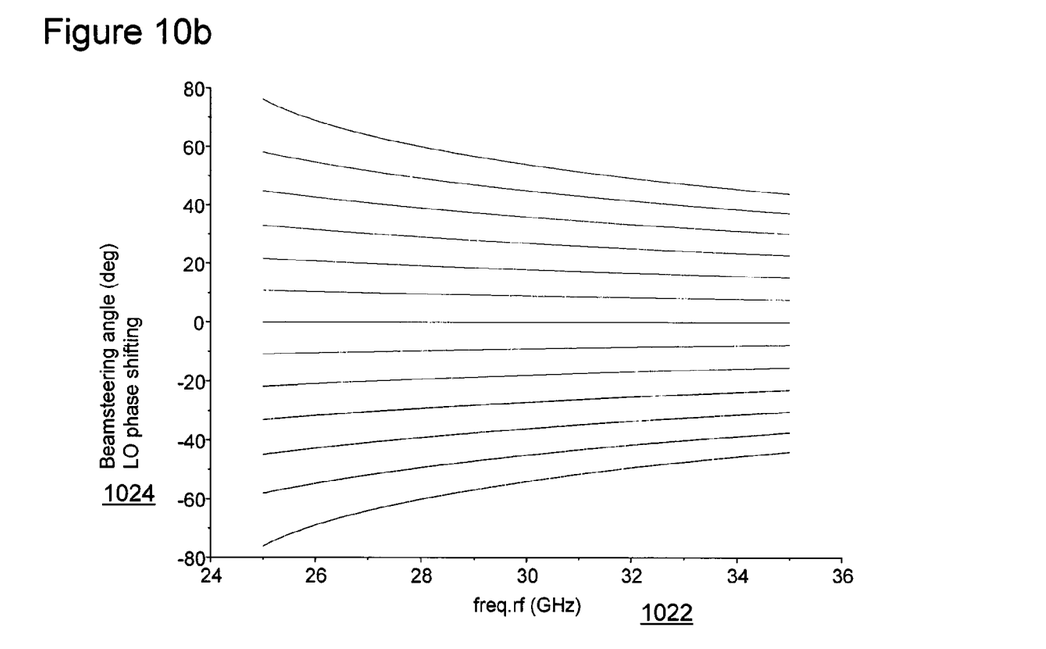

FIG. 10a shows the variation of RF signal time delay on the vertical axis 1004 with RF frequency on the horizontal axis 1002 for a system with LO phase shifting but without IF true time delay. The RF signal time delay 1004 varies non-linearly with RF frequency 1002. FIG. 10b shows the variation of the beam steering angle 1024 on the vertical axis with RF frequency 1022 on the horizontal axis for a system with LO phase shifting but without IF true time delay. The beam steering angle 1024 also varies non-linearly with RF frequency 1022.

It will be appreciated from FIGS. 10a and 10b that when the desired local oscillator time delay of the central frequency signal is set to a value according to a desired beam steering angle for a specific frequency of RF signal, only RF signals that are at the specific frequency are directed at the desired angle. This is because the time delay and beam steering angle change as a function of RF frequency, which means that the beam steering angle cannot be kept constant over a range of RF frequencies, and therefore wide band signals cannot be satisfactorily transmitted.

Figure 10C:
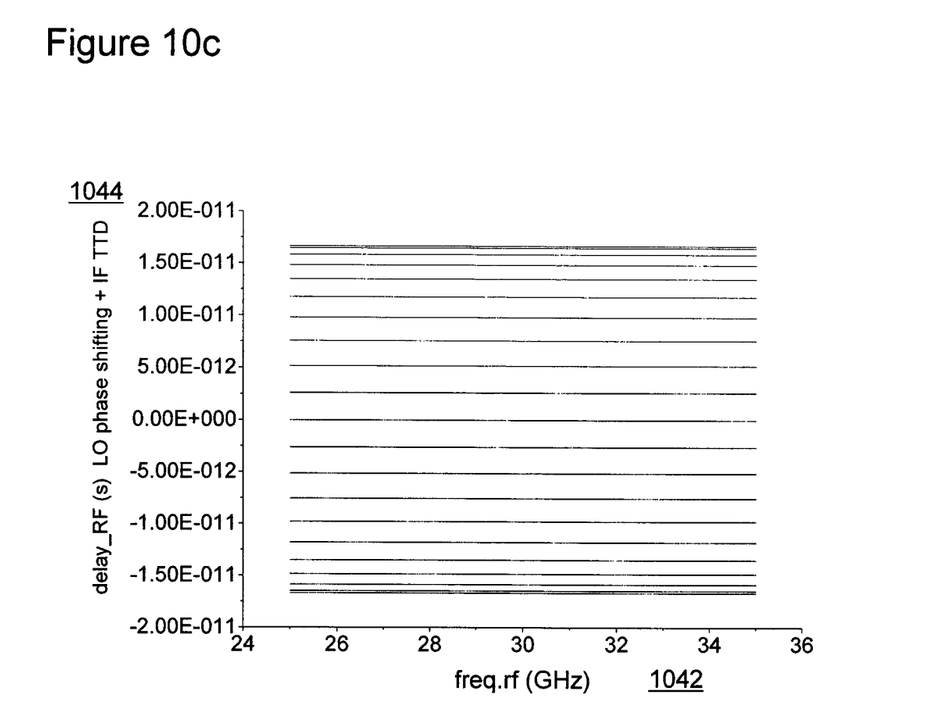
FIGS. 10c-10d illustrate simulation results of the RF signal delay and the beam steering angle for phased array antennas according to embodiments of the invention.
Figure 10D:
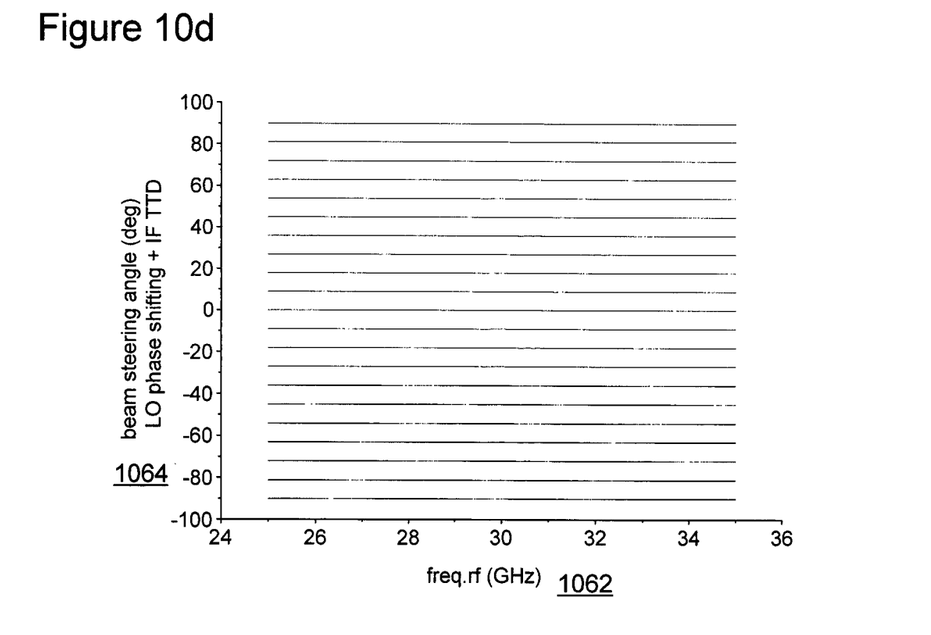

FIG. 10c shows the variation of the RF signal time delay 1044 on the vertical axis with RF frequency 1042 on the horizontal axis for a system with LO phase shifting and IF true time delay. The RF time delay 1044 is constant for RF frequencies 1042 between 25 GHz and 35 GHz. FIG. 10d shows the variation of the beam steering angle 1064 on the vertical axis with RF frequency 1062 on the horizontal axis for a system with LO phase shifting and IF true time delay. The beam steering angle 1064 is also constant for RF frequencies 1062 between 25 GHz and 35 GHz. The consistency of the time delay 1044 and beam steering angle 1064 is advantageous as all RF signals with a frequency between 25 GHz and 35 GHz can be transmitted satisfactorily with the same value for the IF time delay.

Phased array antennas as disclosed herein apply to all kinds of LO phase shifting, and not only to LO phase shifting using the POVM method. The method works, as demonstrated by the simulations in FIGS. 9a-9b and 10a-10d, for any frequency and ideally any bandwidth, as long as the phase shift ratio is set according to the IF and LO frequency ratio discussed herein.

As the calculation is the same for down-conversion, apparatus and methods disclosed here also apply to receivers which require true time delay functionality. Thus the skilled person will appreciate that the embodiments disclosed herein in relation to RF signal transmission can be operated in reverse to receive a wide band signal. In such examples, any RF-upconverter described with reference to transmission can be referred to as a RF-downconverter.

From the simulations is it apparent that systems which do not use IF true time delay provide a bandwidth of 1-3 GHz, as beyond this range, a change of phase as a function of frequency will destroy the beamforming principle. Using IF true time delay as disclosed herein, a bandwidth of at least 10 GHZ may be achieved over which beamforming is possible.

Apparatus and methods disclosed herein may be used for either a transmitter or a receiver when wide band beamforming is required/used. For some applications the full band comprises several narrow channels, a wide band true time delay system can cover all the channels, to relax the LO tuning requirement and LO phase shifter bandwidth. Beamforming, possibly using apparatus and methods as disclosed herein, may be used in point-to-point communication systems for base stations, satellite communication (VSAT) and other such systems. Apparatus and methods disclosed herein advantageously provide high linearity, low loss, accurate ultra wide band beamforming and accurate beam steering capability.

The invention claimed is:

1. A phased array transmitter comprising a plurality of array elements, each array element comprising:
   a vector modulator;
   a true time delay block coupled to the vector modulator;
   a local oscillator phase shifter and RF-converter block coupled to the true time delay block; and
   an antenna;
   wherein
     the vector modulator is configured to apply vector modulation to a baseband signal and provide an intermediate frequency signal to the true time delay block;
     the true time delay block is configured to apply a true time delay to the intermediate frequency signal and provide a delayed intermediate frequency signal to the local oscillator phase shifter and RF-converter block; and
     the local oscillator phase shifter and RF-converter block is configured to multiply the delayed intermediate frequency signal by a local oscillator signal and apply a phase shift to the delayed intermediate frequency signal to provide a radio frequency signal to the antenna for onwards transmission, wherein the local oscillator phase shifter and RF-converter block comprises:
   a phase shifter local oscillator;
   a frequency divider; and
   a poly-phase filter coupled to the phase shifter local oscillator;
   wherein the phase shifter local oscillator, the frequency divider and poly-phase filter are configured to provide multiple phase-shifted local oscillator signals.

2. The phased array transmitter of claim 1, wherein the radio frequency signal is a wide band signal.

3. The phased array transmitter of claim 1, wherein the true time delay block and the local oscillator phase shifter and RF-converter block are configured to provide the radio frequency signal with:
   a phase shift which varies substantially linearly with frequency;
   a radio frequency time delay which is substantially independent of frequency; and
   a beam steering angle which is substantially independent of frequency.

4. The phased array transmitter of claim 1, wherein the vector modulator is an in-phase/quadrature vector modulator.

5. The phased array transmitter of claim 1, wherein the local oscillator phase shifter and RF-converter block further comprises:
   a phase-oversampling vector modulator block configured to apply phase-oversampling vector modulation to the delayed intermediate frequency signal received from the true time delay block using the multiple phase-shifted local oscillator signals to provide the radio frequency signal.

6. The phased array transmitter of claim 5, wherein the phase-oversampling vector modulator block comprises:
   a three-state switch block, the three-state switch block configured to apply a phase switch of +1, −1 or 0 to each of the multiple phase-shifted local oscillator signals to provide multiple phase-switched, phase-shifted, local oscillator signals;

a plurality of mixers configured to mix the multiple phase-switched, phase-shifted, local oscillator signals with the delayed intermediate frequency signal to provide multiple phase-shifted radio frequency signals; and a radio frequency combiner configured to combine the multiple phase-shifted radio frequency signals to provide the radio frequency signal.

7. The phased array transmitter of claim 1, wherein each local oscillator phase shifter and RF-converter block comprises:

a radio frequency up-converter configured to receive the delayed intermediate frequency signal and provide the radio frequency signal; and a variable phase shifter configured to apply a phase shift to a received phase shifter local oscillator signal in order to provide a phase shifted local oscillator signal to the radio frequency up-converter;

wherein each variable phase shifter of the plurality of array elements is configured to receive a common phase shifter local oscillator signal.

8. The phased array transmitter of claim 1, wherein the plurality of array elements comprise a first array element and one or more subsequent array elements;

wherein:

the first array element is configured to receive the intermediate frequency signal directly from the vector modulator; and the one or more subsequent array elements are configured to receive a delayed intermediate frequency signal from a preceding array element in order to provide a further delayed intermediate signal to an associated local oscillator phase shifter and RF-converter block.

9. The phased array transmitter of claim 1, wherein the true time delay block comprises at least one of:

a switched true time delay line;

a tunable discretely passive network having true time delay functionality; and a tunable continuously passive network having true time delay functionality.

10. The phased array transmitter of claim 1, comprising a variable gain amplifier coupled between the true time delay block and the local oscillator phase shifter and RF-converter block.

11. A phased array receiver comprising:

an antenna;

a local oscillator phase shifter and RF-converter block coupled to the antenna;

a true time delay block coupled to the local oscillator phase shifter and RF-converter block; and a vector modulator;

wherein the local oscillator phase shifter and RF-converter block is configured to apply a local oscillator signal to, and apply a phase shift to, a radio frequency signal received by the antenna to provide a delayed intermediate frequency signal;

the true time delay block is configured to apply a true time delay to the delayed intermediate frequency signal provided by the local oscillator phase shifter and RF-converter block and provide an intermediate frequency, signal to the vector modulator; and the vector modulator is configured to apply a vector demodulation to the intermediate frequency signal provided by the true time delay block to provide a baseband signal, wherein the local oscillator phase shifter and RF-converter block comprises:

a phase shifter local oscillator;

a frequency divider; and a poly-phase filter coupled to the phase shifter local oscillator;

wherein the phase shifter local oscillator, the frequency divider and poly-phase filter are configured to provide multiple phase-shifted local oscillator signals.

12. A point-to-point communication system comprising the phased array transmitter of claim 1.

13. A method of providing a radio frequency signal comprising:

applying vector modulation to a baseband signal in order to provide an intermediate frequency signal using a vector modulator;

applying a true time delay to the intermediate frequency signal in order to provide a delayed intermediate frequency signal; and multiplying the delayed intermediate frequency signal by a local oscillator signal and applying a phase shift to the delayed intermediate frequency signal to provide multiple phase-shifted local oscillator signals using a local oscillator phase shifter and RF-converter block comprising a phase shifter local oscillator, a frequency divider and a poly-phase filter coupled to the phase shifter local oscillator, thereby providing the radio frequency signal.

14. A non-transitory computer readable medium comprising a computer program, which when run on a computer, causes the computer to configure the phased array transmitter of claim 1 and configure a point-to-point communication system comprising the phased array antenna of claim 1.

* * * * *